United States Patent
Liu et al.

(10) Patent No.: US 12,096,219 B2
(45) Date of Patent: Sep. 17, 2024

(54) COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Jianhua Liu, Dongguan (CN); Haorui Yang, Dongguan (CN); Qianxi Lu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 336 days.

(21) Appl. No.: 17/561,674

(22) Filed: Dec. 23, 2021

(65) Prior Publication Data

US 2022/0124500 A1    Apr. 21, 2022

Related U.S. Application Data

(63) Continuation of application No. PCT/CN2019/101183, filed on Aug. 16, 2019.

(51) Int. Cl.
    *H04W 12/08*    (2021.01)
    *H04W 8/18*    (2009.01)
    *H04W 84/04*    (2009.01)
    *H04W 88/04*    (2009.01)

(52) U.S. Cl.
    CPC ........... *H04W 12/08* (2013.01); *H04W 8/186* (2013.01); *H04W 84/042* (2013.01); *H04W 88/04* (2013.01)

(58) Field of Classification Search
    CPC ... H04W 12/08; H04W 8/186; H04W 84/042; H04W 88/04
    See application file for complete search history.

(56) References Cited

U.S. PATENT DOCUMENTS

| | | | |
|---|---|---|---|
| 2018/0242393 A1 | 8/2018 | Wei et al. | |
| 2019/0200285 A1 | 6/2019 | Velev et al. | |

(Continued)

FOREIGN PATENT DOCUMENTS

| | | |
|---|---|---|
| CN | 104469695 | 3/2015 |
| CN | 106162803 A | 11/2016 |
| CN | 106470388 A | 3/2017 |

(Continued)

OTHER PUBLICATIONS

International Search Report (ISR) dated May 19, 2020 for Application No. PCT/CN2019/101183, all pages.

(Continued)

*Primary Examiner* — Wayne H Cai
(74) *Attorney, Agent, or Firm* — Ladas & Parry, LLP

(57) ABSTRACT

Embodiments of the present application relate to a communication method, a terminal device and a network device, where the method includes: the terminal device receives first authorization information sent by a core network device, and the first authorization information is used to indicate whether to authorize the terminal device to serve as a relay terminal device and/or a remote terminal device. The communication method, the terminal device, and the network device according to the embodiments of the present application can implement relay authorization for the terminal device in the 5G system.

16 Claims, 6 Drawing Sheets

(56) References Cited

U.S. PATENT DOCUMENTS

2019/0335332 A1    10/2019    Ying et al.
2022/0225448 A1*    7/2022    Li .................... H04W 60/04

FOREIGN PATENT DOCUMENTS

| | | |
|---|---|---|
| CN | 107852591 | 3/2018 |
| CN | 109716810 A | 5/2019 |
| CN | 109997334 A | 7/2019 |
| EP | 3557898 A1 | 10/2019 |
| WO | 2018067956 A1 | 4/2018 |
| WO | 2018126452 A1 | 7/2018 |
| WO | 2018129543 A1 | 7/2018 |
| WO | 2018145084 A1 | 8/2018 |
| WO | 2021031010 A1 | 2/2021 |

OTHER PUBLICATIONS

Written Opinion (WOSA) dated May 19, 2020 for Application No. PCT/CN2019/101183, all pages.

3GPP TS 23.303 V15.1.0;3rd Generation Partnership Project; Technical Specification Group Services and System Aspects;Proximity-based services (ProSe); Stage 2 (Release 15) Jun. 2018, all pages.

The first Office Action of corresponding Chinese application No. 201980092861.8, dated Mar. 15, 2022.

The EESR of corresponding European application No. 19941916.9, dated May 24, 2022.

Philips International B V: "FS_REFEC-Proposed requirements text for network slicing", 3GPP Draft; S1-192139, 3rd Generation Partnership Project (3GPP), Mobile Competence Centre; 650, Route Des Lucioles; F-06921 Sophia-Antipolis C, vol. RAN WG1, No. Sophia Antipolis, France; Aug. 19-Aug. 23, 2019 Aug. 9, 2019(Aug. 9, 2019), XP051756267, entire document.

The second Office Action for the corresponding European patent application No. 19941916.9, dated Jul. 5, 2023.

The second Office Action of corresponding Chinese application No. 201980092861.8, dated Jun. 29, 2022, with machine translation provided by Global Dossier.

The first Office Action of corresponding European application No. 19941916.9, dated Feb. 14, 2023.

* cited by examiner 200
210 The network device sends authorization information whose target object is a terminal device, where the authorization information is used to indicate whether to authorize the terminal device to serve as a relay terminal device and/or a remote terminal device
FIG. 7
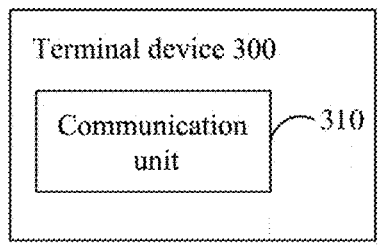
FIG. 8
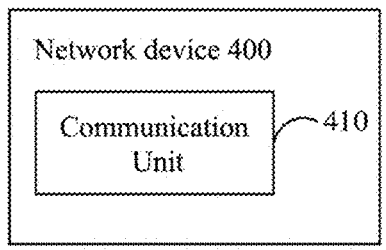
FIG. 9
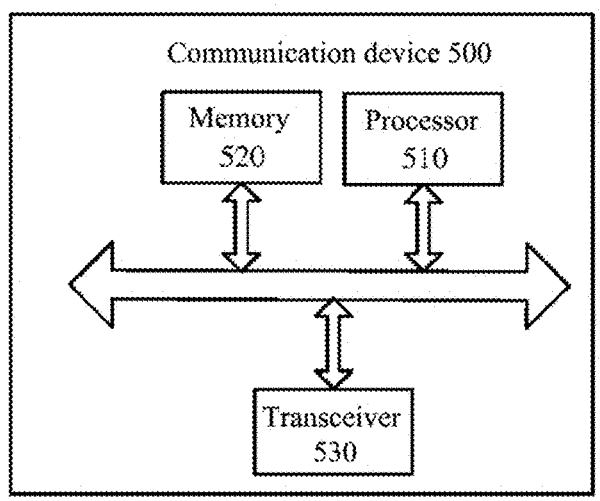
FIG. 10

COMMUNICATION METHOD, TERMINAL DEVICE AND NETWORK DEVICE

CROSS-REFERENCE TO RELATED APPLICATION

This application is a continuation application of PCT Application No. PCT/CN2019/101183, filed on Aug. 16, 2019, the disclosure of which is hereby incorporated by reference in its entirety.

TECHNICAL FIELD

The present application relates to the field of communication and, in particular, to a communication method, a terminal device and a network device.

BACKGROUND

In Proximity based Service (ProSe) of Release 13 (Rel-13), the 3rd Generation Partnership Project (3GPP) introduces a relay function from a terminal device relayed based on layer 3 to a network, that is, a remote terminal device can access to the network through a relay terminal device.

Before the relay function is performed, both the remote terminal device and the relay terminal device are required to be authorized. However, there is no regulation currently on how to perform relay authorization for the terminal device in the new radio (NR) system.

SUMMARY

Embodiments of the present application provide a communication method, a terminal device, and a network device, which can implement relay authorization for the terminal device in the 5G system.

In a first aspect, there is provided a communication method, including: receiving, by a terminal device, first authorization information sent by a core network device, where the first authorization information is used to indicate whether to authorize the terminal device to serve as a relay terminal device and/or a remote terminal device.

In a second aspect, there is provided a communication method, including: sending, by a network device, authorization information whose target object is a terminal device, and the authorization information is used to indicate whether to authorize the terminal device to serve as a relay terminal device and/or a remote terminal device.

In a third aspect, there is provided a terminal device configured to perform the method according to the first aspect or the implementations of the first aspect.

Specifically, the terminal device includes a functional module for performing the method according to the first aspect or the implementations of the first aspect.

In a fourth aspect, there is provided a network device configured to perform the method according to the second aspect or the implementations of the second aspect.

Specifically, the network device includes a functional module for performing the method according to the second aspect or the implementations of the second aspect.

In a fifth aspect, there is provided a terminal device, including a processor and a memory, the memory is configured to store a computer program, and the processor is configured to call and run the computer program stored in the memory, so as to perform the method according to the first aspect or the implementations of the first aspect.

In a sixth aspect, there is provided a network device, including a processor and a memory, where the memory is configured to store a computer program, and the processor is configured to call and run the computer program stored in the memory, so as to perform the method according to the second aspect or the implementations of the second aspect.

In a seventh aspect, there is provided an apparatus, configured to implement the method according to any one of the first aspect to the second aspect or the implementation of any one of the first aspect to the second aspect.

Specifically, the apparatus includes a processor, configured to call and run a computer program from a memory, so that the device installed with the apparatus may perform the method according to any one of the first aspect to the second aspect or the implementation of any one of the first aspect to the second aspect.

In an implementation, the apparatus is a chip.

In an eighth aspect, there is provided a computer-readable storage medium, configured to store a computer program that causes a computer to perform the method according to any one of the first aspect to the second aspect or the implementation of any one of the first aspect to the second aspect.

In a ninth aspect, there is provided a computer program product, including a computer program instruction that causes a computer to perform the method according to any one of the first aspect to the second aspect or the implementation of any one of the first aspect to the second aspect.

In a tenth aspect, there is provided a computer program, when executed on a computer, causing the computer to perform the method according to any one of the first aspect to the second aspect or the implementation of any one of the first aspect to the second aspect.

In the above technical solution, the terminal device receives authorization information sent by the core network device, and the authorization information is used to indicate whether to authorize the terminal device to serve as the relay terminal device and/or the remote terminal device, thereby realizing relay authorization for the terminal device.

BRIEF DESCRIPTION OF THE DRAWINGS

FIG. 7 is a schematic diagram of another communication method according to an embodiment of the present application.

FIG. 8 is a schematic block diagram of a terminal device according to an embodiment of the present application.

FIG. 9 is a schematic block diagram of a network device according to an embodiment of the present application.

FIG. 10 is a schematic block diagram of a communication device according to an embodiment of the present application.

DESCRIPTION OF EMBODIMENTS

The following will describe the technical solution of the embodiments of the present application with reference to the accompanying drawings of the embodiments of the present application. Obviously, the described embodiments are part of the embodiments of the present application, rather than all of them. Based on the embodiments of the present application, all other embodiments obtained by those of ordinary skilled in that art without creative effort belong to the scope of protection of the present application.

The technical solution of the embodiments of the present application can be applied to various communication systems, such as Global System of Mobile communication (GSM), Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Advanced long term evolution (LTE-A) system, New Radio (NR) system, the evolution system of the NR system, LTE-based access to unlicensed spectrum (LTE-U) system, NR-based access to unlicensed spectrum (NR-U) system, Universal Mobile Telecommunication System (UMTS), Worldwide Interoperability for Microwave Access (WiMAX) communication system, Wireless Local Area Networks (WLAN), Wireless Fidelity (WiFi), the next-generation communication system, or other communication systems.

In Rel-13 ProSe, 3GPP introduced the relay function from the terminal device which relays based on layer 3 to the network, that is, the remote terminal device can access the network through the relay terminal device, and the relay terminal device can undertake the relay function of an internet protocol (IP) layer, so as to transfer data between the remote terminal device and the network device. It should be understood that, in Rel-13, ProSe is mainly for public safety services.

For example, if a terminal device A is in a service area without network, a terminal device B is in a service area with network, and the terminal device A closes to the terminal device B, the terminal device A can relay through the terminal device B to communicate with the network. In this situation, the terminal device A is a remote terminal device and the terminal device B is a relay terminal device.

Figure 1:
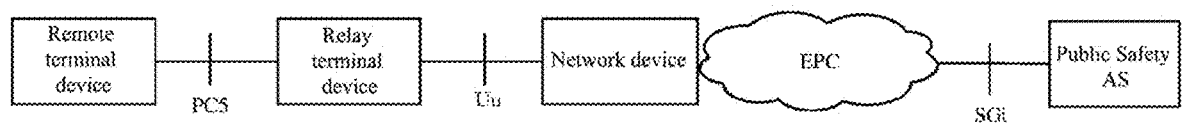
FIG. 1 is a schematic diagram of a relay network architecture according to an embodiment of the present application.

A network structure of Relay can be shown in FIG. 1. The remote terminal device is connected to the relay terminal device through the PC5 interface, the remote terminal device accesses to the network through the relay terminal device, the relay terminal device is connected to the network device through a Uu interface, and the Evolved Packet Core (EPC) is connected to the public safety application server (AS) through the SGi interface. Where the EPC is mainly composed of network elements like Mobile Management Entity (MME), Signaling Gateway (SGW), Packet Data Network GateWay (PGW) and Policy and Charging Rules Function (PCRF).

The remote terminal device and/or the relay terminal device may include, but are not limited to, wired connection, such as connection via Public Switched Telephone Networks (PSTN), Digital Subscriber Line (DSL), digital cable and direct cable; and/or another data connection/network; and/or via a wireless interface, such as a cellular network, wireless local area network (WLAN), and the digital television network such as DVB-H network, satellite network, and AM-FM broadcast transmitter; and/or an apparatus, set to receive/send communication signals, of another terminal device; and/or the Internet of Things (IoT) device. A terminal device set to communicate through a wireless interface may be referred to as a "wireless communication terminal", a "wireless terminal" or a "mobile terminal". The example of the mobile terminals includes, but is not limited to, the satellite or the cellular phone; the Personal Communications System (PCS) terminal that can combine the cellular radio phone with data processing, fax, and data communication capabilities; the PDA that can include a radio phone, a pager, Internet/Intranet access, a Web browser, a memo pad, a calendar, and/or a Global Positioning System (GPS) receiver; and a conventional laptop and/or palmtop receiver or other electronic devices including radio telephone transceivers. The terminal device can refer to an access terminal, a user equipment (UE), a user unit, a user station, a mobile station, a mobile station, a remote station, a remote terminal, a mobile device, a user terminal, a terminal, a wireless communication device, a user agent, or a user device. The access terminal can be a cellular phone, a cordless phone, a Session Initiation Protocol (SIP) phone, a Wireless Local Loop (WLL) station, a Personal Digital Assistant (PDA), a handheld device with a wireless communication function, a computing device or other processing devices connected to a wireless modem, a vehicle-mounted device, a wearable device, a terminal device in a 5G network, or a terminal device in a PLMN that will evolve in the future.

The network device can be a Base Transceiver Station (BTS) in a GSM system or a CDMA system, or can be the NodeB (NB) in the WCDMA system, can also be the Evolutional Node B (eNB or eNodeB) in the LTE system, or the wireless controller in the Cloud Radio Access Network (CRAN); alternatively, the network device can be a mobile switching center, a relay station, an access point, a vehicle-mounted device, a wearable device, a hub, a switch, a bridge, a router, a network side device in the 5G network, or may be a network device in a Public Land Mobile Network (PLMN) that will evolve in the future, etc.

The remote terminal device and the relay terminal device are required to be authorized before performing the relay function.

In the LTE system, the authorization of the remote terminal device and the relay terminal device is performed by a ProSe function entity through a PC3 interface. A possible network architecture of ProSe can be shown in FIG. 2. The network architecture of FIG. 2 includes two terminal devices, that is, a UE A and a UE B, and the UE A and the UE B are connected through a PC5 interface. The UE A may be a remote UE and the UE B may be a relay UE, or the UE A may be a relay UE and the UE B may be a remote UE. The UE A and the UE B may belong to a Public Land Mobile Network (PLMN), or they may belong to two PLMNs, respectively.

Figure 2:
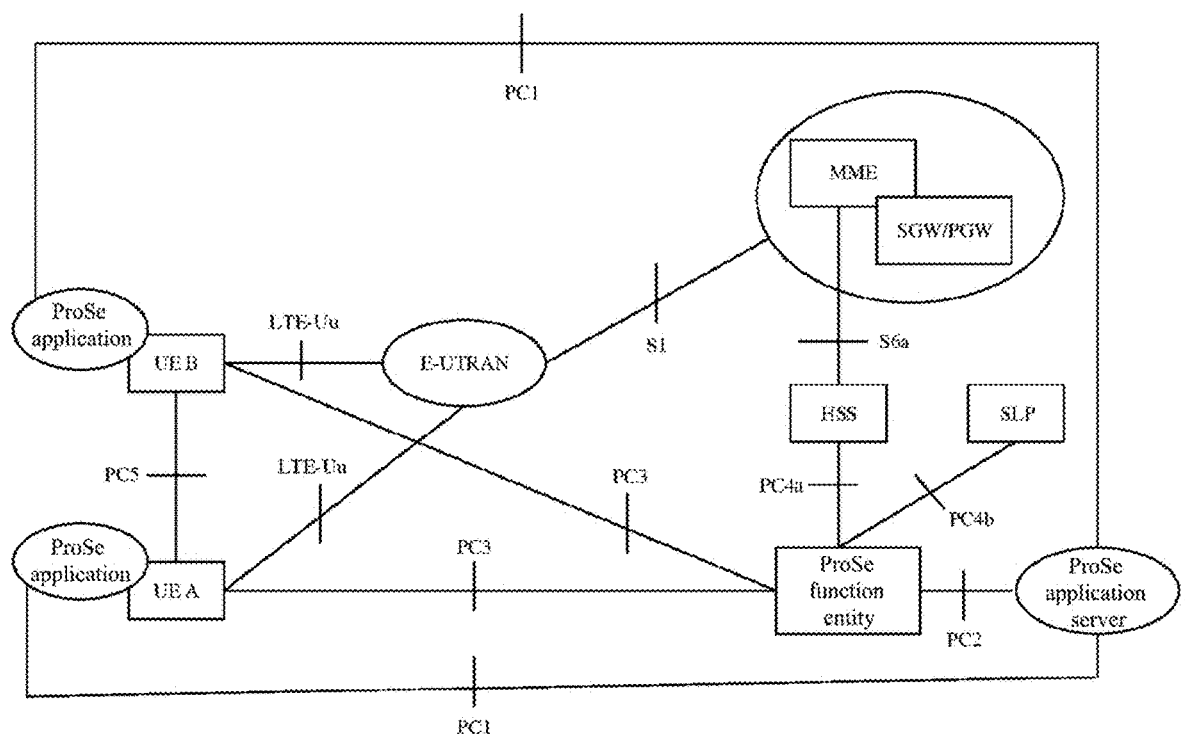
FIG. 2 is a schematic diagram of a network architecture of ProSe in a LTE system.

The network architecture of FIG. 2 also includes the access network device, that is, the Evolved Universal Terrestrial Radio Access Network (E-UTRAN). The UE A and the UE B are respectively connected to E-UTRAN through LTE-Uu interfaces. In addition, the network architecture of FIG. 2 also includes MME, SGW/PGW, Home Subscriber Server (HSS), Service Location Protocol (SLP), ProSe Function entity, and ProSe Application Server. Where the E-UTRAN is connected to the MME and the SGW/PGW through the S1 interface. The UE A and the UE B can provide the related ProSe application, and their interface with the ProSe Application Server is a PC1 interface which provides the related authentication function. The ProSe Function entity is connected to the UE A and the UE B through the PC3 interface, and used for the ProSe Function entity to perform relay authorization on the UE A and the UE B. Interfaces between the ProSe Function entity and the HSS and between the ProSe Function entity and the SLP are PC4a and PC4b, respectively, and the interface between the ProSe Function entity and the ProSe Application Server is PC2 which is used for application implementation of the ProSe service.

Figures 3, 4:
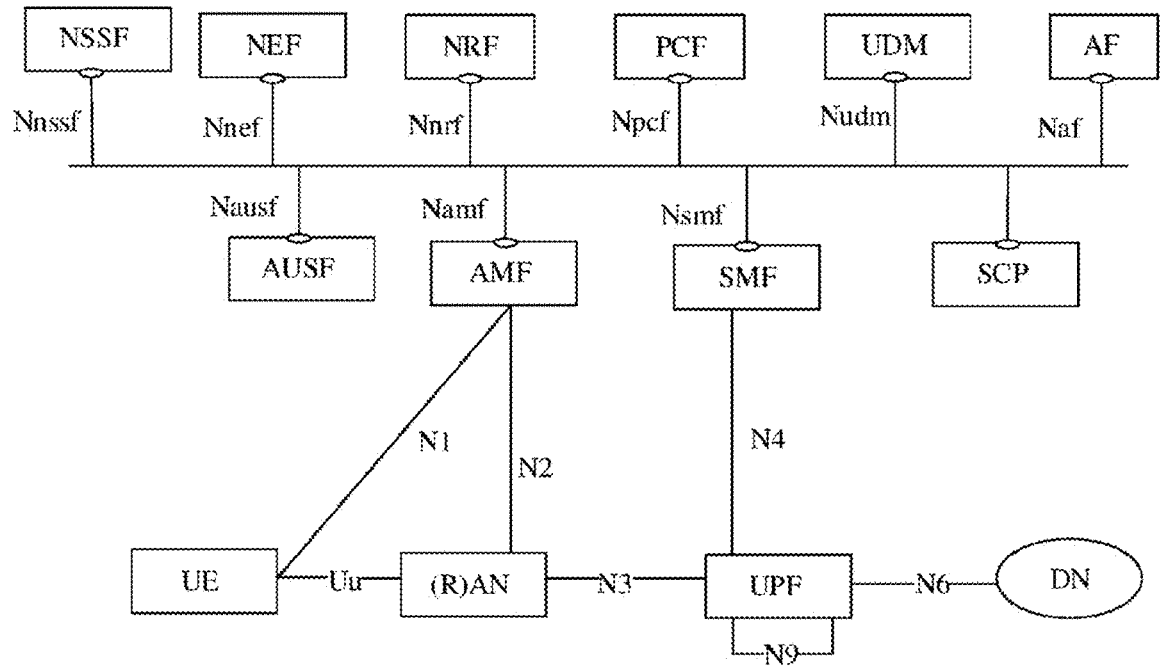
FIG. 3 is a schematic diagram of a communication system architecture according to an embodiment of the present application.
FIG. 4 is a schematic diagram of a communication method according to an embodiment of the present application.

The 5G system adopts a service-oriented architecture shown in FIG. 3. The communication system may include a UE, an access network (AN or Radio Access Network, RAN) device, a user plane function (UPF), data network (DN), and authentication service function (AUSF), access and mobility management function (AMF), session management function (SMF), service control point (SCP), network slice selection function (NSSF), Network Exposure Function (NEF), Network Function Repository Function (NRF), Policy Control Function (PCF), Unified Data Management (UDM) and Application Function (AF).

The AMF is responsible for mobility and access management of users, the SMF is responsible for session management function of users, and the UDM is responsible for unified processing of foreground data which includes user identification, user subscription data, authentication data, etc. The AUSF cooperates with the UDM to specifically process data related to user authentication. The NEF is responsible for opening the network data to the public, NRF is responsible for registering and managing the Network Function (NF), and the NSSF is used to manage information related to network slicing.

There can be different interfaces between various devices, for example, N1 is an interface connecting UE and AMF, N2 is an interface connecting AMF and RAN, N3 is an interface connecting RAN and UPF, N4 is an interface connecting SMF and UPF, etc. Nnnsf, Nnef, Nnrf, Npcf, Nudm, Nausf, Namf, Nsmf in FIG. 3 are service-oriented interfaces, and all service-oriented interfaces can be transmitted on a same bus (that is, a long horizontal line in FIG. 3). Therefore, this communication method also can be understood as a bus communication method.

As can be seen from FIG. 3, in the 5G system, there is no the ProSe Function entity and the PC3 interface in the LTE system. Therefore, how to perform relay authorization on a terminal device (like the UE in FIG. 3) is a problem that needs to be solved urgently. In addition, the 5G system introduces more fine-grained relay functions, and these relay functions also need to be authorized respectively.

As such, an embodiment of the present application provides a communication method, which can realize the relay authorization of the terminal device in the 5G system.

FIG. 4 is a schematic diagram of a communication method 100 according to an embodiment of the present application. The method according to FIG. 4 may be executed by a terminal device, which may be, for example, the UE shown in FIG. 3. As shown in FIG. 4, the method 100 may include at least part of the following.

In 110, the terminal device receives first authorization information sent by the core network device, where the first authorization information is used to indicate whether to authorize the terminal device to serve as a remote terminal device and/or a relay terminal device.

The first authorization information may be carried in a non-access stratum (NAS) message sent by the core network device.

In an implementation, the communication system in the embodiments of the present application may include at least one remote terminal device and at least one relay terminal device.

In an implementation, the terminal device may be located in at least one communication link. For example, if the terminal device is only located in one communication link, the terminal device may be a remote terminal device or a relay terminal device in the communication link. For another example, if the terminal device is located in two communication links, it may be a remote terminal device in one of the communication links and be a relay terminal device in the other communication link.

It should be understood that the term "and/or" used herein is only a description of the association relationship of the associated objects, indicating that there can be three types of relationships, for example, A and/or B, which can represent the three situations: A exists alone, A and B exist at the same time, and B exists alone. In addition, the character "/" used herein generally indicates that context objects are of an "or" relationship.

In an implementation, the first authorization information may include, but is not limited to, at least one of the following:

(a) identification information of the terminal device.

The identification information of the terminal device can be any one of the following: Subscription Permanent Identifier (SUPI), Subscription Concealed Identifier (SUCI), Permanent Equipment Identifier (PEI), and Generic Public Subscription Identifier (GPSI).

(b) Whether the terminal device is authorized to serve as a remote terminal device and/or a relay terminal device.

(c) For a specific service, whether the terminal device is authorized to serve as a remote terminal device and/or a relay terminal device.

The specific service can be, but is not limited to, Ultra Reliable Low Latency Communication (U URLLC) service, Enhanced Mobile Broadband (eMBB) service, Industrial Internet of Things (IIoT) service, Vertical industry service, Voice over Long-Term Evolution (VoLTE) service, Internet of Vehicles service, and Time Sensitive Network (TSN) service.

In an implementation, the embodiments of the present application may use an application ID to identify a specific service. Where the Application ID is composed of both the Operating System (OS) ID and Application ID (APP ID).

(d) For a specific group, whether the terminal device is authorized to serve as a remote terminal device and/or a relay terminal device.

In an implementation, the specific group may be composed of external group IDs.

In an implementation, the "group" here may be understood as the group where the terminal device is located. It should be understood that one terminal device may be in one group or in multiple groups, which is not specifically limited in the embodiments of the present application.

In an implementation, the above "for a specific group" may be, but not limited to, at least one of the following: for scale information of a specific group, for external network server information of a specific group, for network slice information of a specific group, for Quality of Service (QoS) information of a specific group, for frequency band information of a specific group, for security level information of the specific group, and for current capacity information of the specific group.

The size of the group can be understood as the maximum number of group members that can be accommodated. The group with the largest number of group members that can be accommodated has a large scale, and the group with a smallest maximum number of group members that can be accommodated has a small scale.

The network slice of the group may include the network slice of the EMBB, the network slice of the URLLC, the network slice of Massive Machine Type Communications (mMTC), and so on.

The QoS information of the group may include, but is not limited to, the delay information of the group, the bandwidth information of the group, and the reliability information of the group.

The current capacity of the group can be understood as the current number of members of the group, or the number of members that can be accommodated by the group.

(e) For a specific service in a specific group, whether the terminal device is authorized to serve as a remote terminal device and/or a relay terminal device.

(f) For a specific external network server (for example, Data network name, DNN) or a specific network slice, whether the terminal device is authorized to serve as a remote terminal device and/or a relay terminal device.

The specific network slice may include the network slice of the EMBB, the network slice of the URLLC, and the network slice of the mMTC, and so on.

(g) For the communication mode supported or operated by the terminal device, whether the terminal device is authorized to serve as a remote terminal device and/or a relay terminal device.

For example, when the terminal device runs in the Narrow Band Internet of Things (NB-IOT) mode, whether the terminal device is used as a remote terminal device and/or a relay terminal device.

For another example, regarding the Radio Access Technology (RAT) used by the terminal device on the Uu interface, whether the terminal device is allowed to serve as a remote terminal device and/or a relay terminal device.

For a yet another example, regarding the RAT used by the terminal device on the PC5 interface, whether the terminal device is allowed to serve as a remote terminal device and/or a relay terminal device.

(h) PLMN information applicable to the first authorization information.

Exemplarily, the first authorization information may include: whether the first authorization information is only applicable to the current PLMN, or is also applicable to Equivalent Public Land Mobile Network (ePLMN).

Exemplarily, the first authorization information may include: the first authorization information is applicable to at least one of the PLMN of China Unicom, the PLMN of China Mobile, and the PLMN of China Telecom.

(i) The communication area applicable to the first authorization information.

In an implementation, the communication area applicable to the first authorization information may be a registration area applicable to the first authorization and/or a service area applicable to the first authorization information.

For example, the communication area applicable to the first authorization information is the current registration area, or the first authorization information may be applicable to any registration area, or the first authorization information may be applicable to a registration area in a specific registration area list.

(j) Time applicable to the first authorization information.

As an example, the time applicable to the first authorization information may be the duration applicable to the first authorization information. For example, the duration applicable to the first authorization information is 10 ms, or the duration applicable to the first authorization information is 5 time units. Where the time unit can be a subframe, a time slot, a time domain symbol, or a Short Transmission Time Interval (sTTI).

In an implementation, the network device may configure a timer for the terminal device. If the timer expires, it indicates that the first authorization information is invalid; or if the timer does not expire, it indicates that the first authorization information is valid.

As another example, the time applicable to the first authorization information may be absolute time.

Exemplarily, the first authorization information may be valid in a specific period every day; for example, the first authorization information may be valid from 9:00 to 18:00 every day. And exemplarily, the first authorization information may be valid before a specific time. For example, the first authorization information is valid before Sep. 1, 2019.

The following illustrates the technical solution of the embodiment of the present application in combination with two embodiments, respectively.

Embodiment 1: The Network Device Actively Provides the First Authorization Information to the Terminal Device After obtaining authorization assistance information, the AF can provide the authorization assistance information to the UDM. Specifically, if there is a direct interface between the AF and the UDM, the AF can directly send the authorization assistance information to the UDM through the interface between the AF and the UDM. Alternatively, if there is no direct interface between the AF and the UDM, the authorization assistance information can be transferred through the NEF. That is, the AF sends the authorization assistance information to the NEF, and then the NEF sends the authorization assistance information to the UDM.

The authorization assistance information may include, but is not limited to, at least one of the following:
identification information of the terminal device;
whether the terminal device is authorized to serve as a remote terminal device and/or a relay terminal device;
for a specific service, whether the terminal device is authorized to serve as a remote terminal device and/or a relay terminal device;
for a specific group, whether the terminal device is authorized to serve as a remote terminal device and/or a relay terminal device;
for a specific service in a specific group, whether the terminal device is authorized to serve as a remote terminal device and/or a relay terminal device;
for a specific external network server or a specific network slice, whether the terminal device is authorized to serve as a remote terminal device and/or a relay terminal device;
for the communication mode supported or operated by the terminal device, whether the terminal device is authorized to serve as a remote terminal device and/or a relay terminal device;

PLMN information applicable to the authorization assistance information;

the communication area applicable to the authorization assistance information; and time applicable to the authorization assistance information.

It should be understood that for the description of the authorization assistance information, reference may be made to the description of the first authorization information. In order to avoid redundant description, detailed description is omitted herein.

After receiving the authorization assistance information, the UDM can store the authorization assistance information and send the authorization assistance information to the PCF.

The UDM saves the authorization assistance information, so if the UDM needs to use the authorization assistance information later, saved authorization assistance information can be directly obtained, which can save communication time.

When the UDM sends the authorization assistance information to the PCF, in an implementation, the UDM may send the authorization assistance information to the PCF as a transparent container.

After receiving the authorization assistance information, the PCF determines whether to modify the authorization assistance information to obtain the first authorization information that is finally provided to the terminal device.

Whether the PCF modifies the authorization assistance information can be understood as: whether the PCF modifies or deletes at least part of the authorization assistance information, and/or whether the PCF adds part of the information to the authorization assistance information.

As an example, the PCF may never modify the authorization assistance information after receiving the authorization assistance information. In this case, the authorization assistance information is the same as the first authorization information.

As another example, the PCF can always modify the authorization assistance information after receiving the authorization assistance information. In an implementation, the agreement may stipulate that the PCF will always modify the authorization assistance information after receiving the authorization assistance information.

As another example, the PCF may determine whether to modify the authorization assistance information according to the operator's policy and/or local configuration information.

As another example, the PCF may determine whether to modify the authorization assistance information this time according to the case that whether the authorization assistance information was modified after the authorization assistance information is received last time. For example, if the PCF does not modify the authorization assistance information last time, the PCF can determine that the authorization assistance information will not be modified this time. Alternatively, if the PCF does not change the authorization assistance information last time, the PCF can determine that the authorization assistance information is modified this time.

As another example, the PCF can determine whether to modify the authorization assistance information according to current network conditions. For example, if the current network condition is good, the PCF may modify the authorization assistance information; and if the current network condition is poor, the PCF may not change the authorization assistance information.

In the case where the PCF determines to modify the authorization assistance information, in an implementation, the PCF can modify the authorization assistance information according to the operator's policy and/or local configuration information to obtain the first authorization information.

Afterwards, in an implementation, the PCF may send the first authorization information to the AMF. In an implementation, the PCF may encapsulate the first authorization information in a transparent container and send it to the AMF.

After receiving the first authorization information, the AMF can determine whether to send the first authorization information to the terminal device.

As an example, the AMF may send the first authorization information to the terminal device in any case.

As another example, the AMF may determine whether to send the first authorization information to the terminal device according to the capability information that whether the terminal device supports the relay function. That is, if the terminal device does not support the relay function, the AMF may not send the first authorization information to the terminal device; and if the terminal device supports the relay function, the AMF may send the first authorization information to the terminal device.

As another example, the AMF may determine whether to send the first authorization information to the terminal device according to whether the terminal device is performing the relay function at this time. For example, if the terminal device is performing the relay function at this time, the AMF may not send the first authorization information to the terminal device; and if the terminal device is not performing the relay function at this time, the AMF determines to send the first authorization information to the terminal device.

As another example, the AMF may determine whether to send the first authorization information to the terminal device according to the priority of the terminal device. For example, if the priority of this terminal device is low, the AMF may send the first authorization information to a terminal device with high priority, rather than sending to this terminal device; and if the priority of this terminal device is higher, the AMF may send the first authorization information to this terminal device.

As another example, the AMF may determine whether to send the first authorization information to the terminal device according to a current distance between the terminal device and the network device. For example, if the first authorization information indicates that the terminal device is allowed to act as a relay terminal device, when the terminal device is currently far away from the network device, the AMF may not send the first authorization information to the terminal device. For another example, if the first authorization information indicates that the terminal device is allowed to act as a remote terminal device, when the terminal device is currently close to the network device, the AMF may not send the first authorization information to the terminal device.

If the AMF does not send the first authorization information to the terminal device, the AMF may send the second feedback information to the PCF, and the second feedback information is used to feed back that the AMF does not send the first authorization information to the terminal device. Further, the first feedback information may also include the reason why the AMF does not send the first authorization information to the terminal device. For example, the first feedback information may include that the terminal device does not support the relay function.

If the AMF determines to send the first authorization information to the terminal device, the AMF may encapsulate the first authorization information into a NAS Protocol Data Unit (PDU) and transmit it to the terminal device. That is, the AMF does not parse, but only encapsulates the first authorization information into the NAS message. At this point, in an implementation, the AMF may indicate to the terminal device that the NAS message carries the first authorization information.

Alternatively, after parsing the first authorization information, the AMF may send the first authorization information to the terminal device.

In another implementation, the PCF may send the first authorization information to the SMF. In an implementation, the PCF may encapsulate the first authorization information into a transparent container and then send it to the SMF. Afterwards, the SMF may send the first authorization information to the terminal device.

It should be understood that the subsequent behavior of the SMF after receiving the first authorization information can refer to the behavior of the AMF, which will not be repeated herein.

After receiving the NAS message, the terminal device can determine whether to apply the first authorization information.

In an implementation, the terminal device may determine to apply the first authorization information in any case.

In another implementation form, the terminal device may determine whether to apply the first authorization information according to supported capability information and/or user preference information.

The capability of the terminal device may include, for example, baseband capability, radio frequency capability, measurement capability, terminal category, resource allocation capability, communication mode capability, and carrier aggregation (CA) capability.

For example, if the communication mode to which the first authorization information is applicable is a multicast communication mode, and the terminal device does not support the multicast communication mode capability, the terminal device may determine not to apply the first authorization information.

For example, the service targeted by the first authorization information is WeChat, and the probability of users using WeChat A is particularly high. Therefore, the terminal device determines to apply the first authorization information.

After determining whether to apply the first authorization information, the terminal device may send first feedback information to the AMF, and the first feedback information includes a result of whether to apply the first authorization information determined by the terminal device. After receiving the first feedback information, the AMF may send the first feedback information to the PCF.

The first feedback information sent by the terminal device to the AMF is carried in the NAS message.

It should be understood that in the embodiments of the present application, "first" and "second" are only used to distinguish different objects, but do not limit the scope of the embodiments of the present application.

Figure 5:
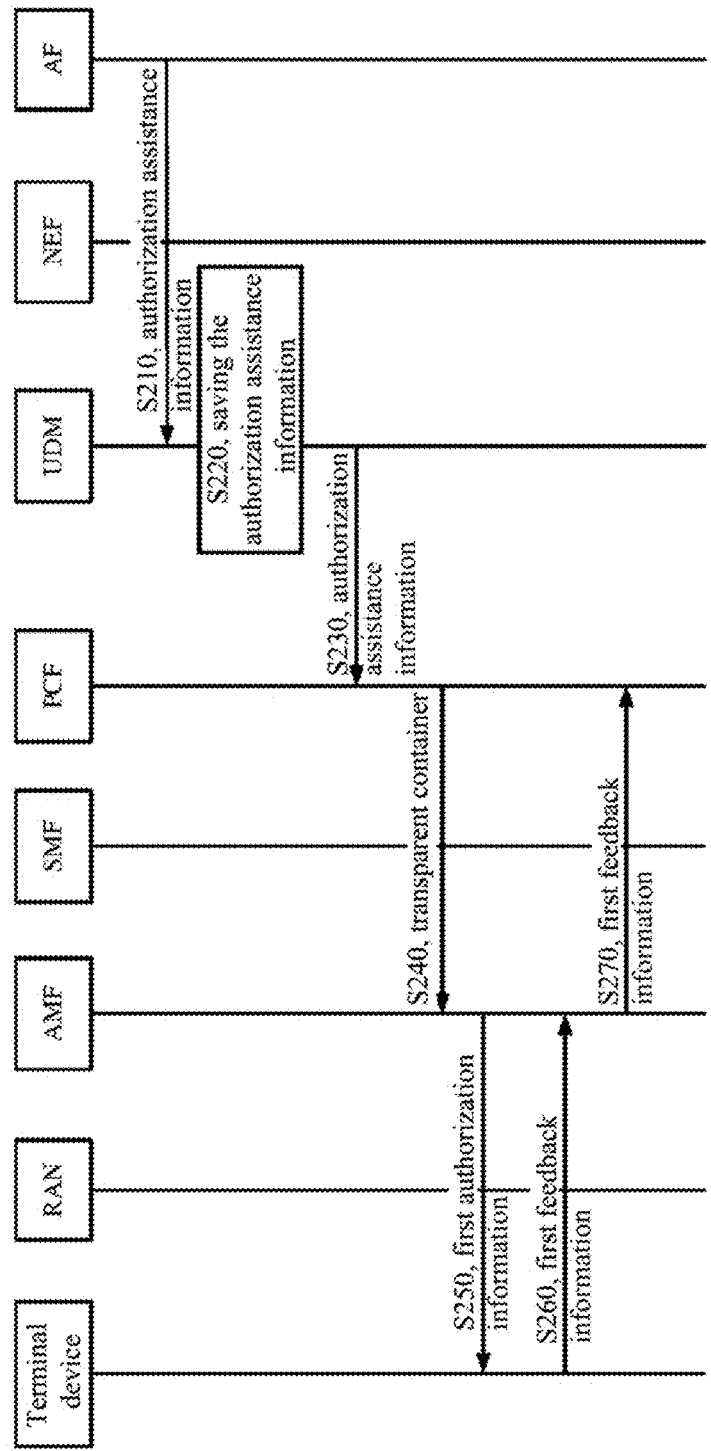
FIG. 5 is a schematic flowchart of a specific implementation of a communication method according to an embodiment of the present application.

The specific implementation of the communication method of Embodiment 1 will be exemplarily described below with reference to FIG. 5.

S210: the AF sends the authorization assistance information to the UDM.

S220: the UDM saves the authorization assistance information.

S230: the UDM sends the authorization assistance information as a transparent container to the PCF.

S240: after receiving the authorization assistance information, the PCF modifies the authorization assistance information to obtain the first authorization information, and encapsulates the first authorization information in a transparent container and sends it to the AMF.

S250: the AMF encapsulates the received first authorization information into a NAS PDU and transmits it to the terminal device.

S260: after receiving the NAS message, the terminal device determines to apply the first authorization information according to its own capability information, and sends the first feedback information to the AMF, and the first feedback information is used to feed back the terminal device to apply the first authorization information.

S270: after receiving the first feedback information, the AMF sends the first feedback information to the PCF.

Embodiment 2: The Network Device Provides the First Authorization Information Based on the Request of the Terminal Device When a terminal device is required to initiate a relay service, the terminal device may send authorization request information to the AMF or the SMF, and the authorization request information is used to request to serve as a relay terminal device and/or a remote terminal device.

In an implementation, the authorization request information may be carried in a NAS message.

In the following cases, it can be considered that the terminal device is required to initiate a relay service:
case 1: the application layer sends a request for relay-related services;
case 2: if the terminal device receives, from another terminal device, a relay request to serve as a remote terminal device, the terminal device can request to serve as a relay terminal device;
case 3: when the terminal device is far away from the network device and may not be served by the network device, the terminal device can request to serve as a remote terminal device.

For the ease of description, the case that the terminal device sends the authorization request information to the AMF will be taken as an example for description in the following embodiments, but the present application is not limited thereto.

After receiving the authorization request information, the AMF can send the authorization request information to the PCF. The PCF can determine whether to allow the authorization request of the terminal device based on both the authorization request information and the authorization assistance information. After determining whether the authorization request of the terminal device is allowed, the PCF may send the authorization request response information to the AMF, and the authorization request response information is used to indicate whether the authorization request of the terminal device is allowed.

If the authorize assistance information is not available to the PCF, the PCF can obtain it from the UDM. As an example, the UDM can encapsulate the saved authorization assistance information into a transparent container and send it to the PCF. As another example, if the UDM does not store the authorization assistance information, the UDM may request the AF to provide the authorization assistance information. In this way, the AF can provide the authorization assistance information to the UDM, and the UDM then sends the authorization assistance information to the PCF.

After receiving the authorization assistance information, the PCF determines whether to modify the authorization assistance information to obtain the first authorization information. The implementation for determining, by the PCF, whether to modify the authorization assistance information can refer to Embodiment 1, which will not be repeated herein.

In an implementation, the authorization request information may also include at least one of the following (for ease of description, it is referred to as corresponding information authorized by the relay): identification information of the terminal device, a specific service targeted by the authorization request information, a specific group targeted by the authorization request information, a specific service in a specific group targeted by the authorization request information, a specific external network server or a specific network slice targeted by the authorization request information, a communication mode targeted by the authorization request information, PLMN information targeted by the authorization request information, a communication area targeted by the authorization request information, and applicable time targeted by the authorization request information.

It should be understood that the specific description of the corresponding information authorized by the relay can refer to the description of the first authorization information. For the sake of brevity, no further description will be given herein.

In this case, if the authorization request of the terminal device is allowed by the PCF, the PCF may provide, for the corresponding information authorized by the relay, the AMF with the first authorization information whose target object is a terminal device, thereby saving the signaling overhead and improving the communication efficiency.

In an implementation, if the authorization request information does not include the corresponding information authorized by the relay, the PCF may provide all the first authorization information to the terminal device.

It should be noted that the following behavior of the terminal device after receiving the first authorization information has been described in detail in Embodiment 1, and will not be repeated herein.

Figure 6:
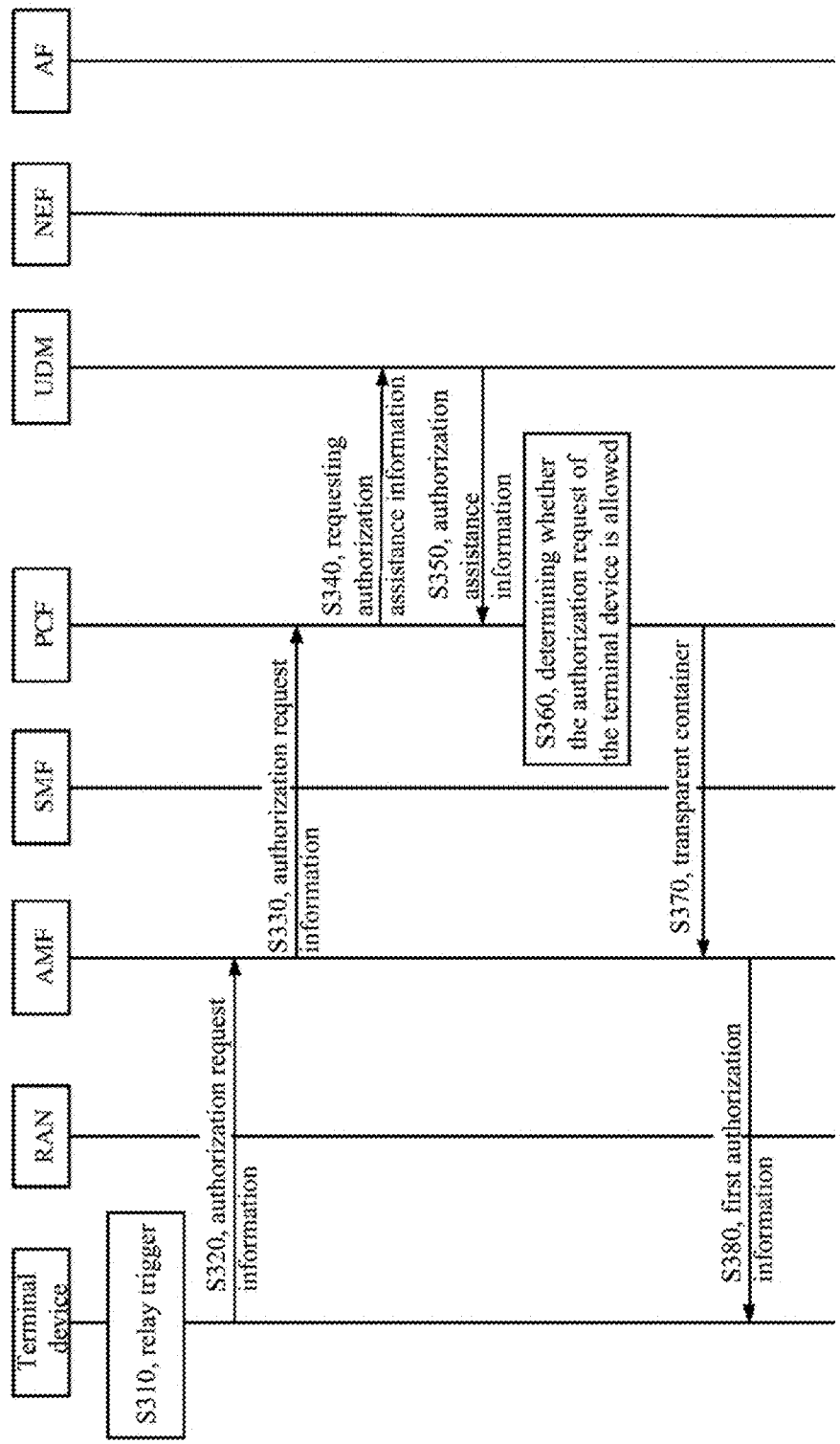
FIG. 6 is a schematic flowchart of a specific implementation of another communication method according to an embodiment of the present application.

The specific implementation of the communication method of Embodiment 2 will be exemplarily described below with reference to FIG. 6.

S310: the application layer initiates a request for a relay-related service to trigger the relay.

S320: the terminal device sends the authorization request information to the AMF to request to serve as a relay terminal device and/or a remote terminal device.

S330: the AMF sends the authorization request information to the PCF.

S340: the authorization assistance information is not available to the PCF, and the PCF requests the authorization assistance information from the UDM.

S350: the UDM sends the saved authorization assistance information to the PCF through the transparent container.

S360: after receiving the authorization assistance information, the PCF determines whether to allow the authorization request of the terminal device.

S370: the PCF determines to allow the authorization request of the terminal device, to modify the authorization assistance information to obtain the first authorization information, and to send the first authorization information to the AMF through the transparent container.

S380: after receiving the first authorization information, the AMF encapsulates the first authorization information into a NAS PDU and transmits it to the terminal device.

In this embodiment of the present application, the terminal device receives the authorization information sent by the core network device, and the authorization information is used to indicate whether to authorize the terminal device to serve as a relay terminal device and/or a remote terminal device, thereby realizing relay authorization for the terminal device.

The above describes the communication method of the embodiments of the present application in detail from the perspective of a terminal device, and the communication method 200 of the embodiments of the present application will be described following from the perspective of a network device with reference to FIG. 7. As shown in FIG. 7, the method 200 may include at least part of the following.

In 210, the network device sends the authorization information whose target object is a terminal device, and the authorization information is used to indicate whether to authorize the terminal device to serve as a relay terminal device and/or a remote terminal device.

In an implementation, the network device is an AF, the authorization information is authorization assistance information, and the network device sends the authorization information whose target object is a terminal device includes: the AF sends the authorization assistance information to the unified data management (UDM).

In an implementation, the AF sends the authorization assistance information to the UDM includes: the AF sends the authorization assistance information to the UDM through the NEF.

In an implementation, the network device is an NEF, the authorization information is authorization assistance information, and the network device sends the authorization information whose target object is a terminal device includes: the NEF sends the authorization assistance information to the UDM.

In an implementation, the method 200 further includes: the NEF receives the authorization assistance information sent by the AF.

In an implementation, the network device is an UDM, the authorization information is authorization assistance information, and the network device sends the authorization information whose target object is a terminal device includes: the UDM sends the authorization information to the policy control function (PCF).

In an implementation, the method 200 further includes: the UDM receives the authorization assistance information sent by the AF.

In an implementation, the UDM receives the authorization assistance information sent by the AF includes: the UDM receives the authorization assistance information sent by the AF through the NEF.

In an implementation, the method 200 further includes: the UDN saves the authorization assistance information.

In an implementation, the network device is a PCF, the authorization information is first authorization information, and the method 200 further includes: the PCF receives the authorization assistance information sent by the UDM, and the authorization assistance information is used to indicate whether to authorize the terminal device to serve as a relay terminal device and/or a remote terminal device; and the PCF determines whether to modify the authorization assistance information according to the operator's policy and/or local configuration information, so as to obtain the first authorization information.

In an implementation, the network device sends the authorization information whose target object is a terminal device includes: the PCF sends the first authorization information to the AMF.

In an implementation, the PCF sends the first authorization information to the AMF includes: the PCF sends the first authorization information to the AMF through a transparent container.

In an implementation, the method 200 further includes: the PCF receives the authorization request information sent by the AMF, and the authorization request information is used to request authorization to serve as a relay terminal device and/or a remote terminal device; the PCF determines whether to allow the authorization request of the terminal device based on the authorization request information; and the PCF sends authorization request response information to the AMF, and the authorization request response information is used to indicate whether the authorization request is allowed.

In an implementation, the method 200 further includes: the PCF receives second feedback information sent by the AMF, and the second feedback information is used to feed back that the AMF does not send the first authorization information to the terminal device.

In an implementation, the method 200 further includes: the PCF receives first feedback information sent by the AMF, and the first feedback information includes a result of whether to apply the first authorization information determined by the terminal device.

In an implementation, the network device sends the authorization information whose target object is a terminal device includes: the PCF sends the first authorization information to the SMF.

In an implementation, the network device is an AMF, the authorization information is the first authorization information, and the method 200 further includes: the AMF receives the first authorization information sent by the PCF.

In an implementation, the AMF receives the first authorization information sent by the PCF includes: the AMF receives the first authorization information through a transparent container.

In an implementation, the method 200 further includes: the AMF determines whether to send the first authorization information to the terminal device.

In an implementation, the AMF determines whether to send the first authorization information to the terminal device includes: the AMF determines whether to send the first authorization information to the terminal device according to capability information that whether the terminal device supports the relay function.

In an implementation, the network device sends the authorization information whose target object is a terminal device includes: the AMF sends the first authorization information to the terminal device.

In an implementation, in the embodiment of the present application, the method 200 further includes: the AMF receives first feedback information sent by the terminal device, and the first feedback information includes the result of whether to apply the first authorization information determined by the terminal device; the AMF sends the first feedback information to the PCF.

In an implementation, in the embodiment of the present application, the method 200 further includes: the AMF receives authorization request information sent by the terminal device, and the authorization request information is used to request authorization to serve as a relay terminal device and/or a remote terminal device; the AMF sends the authorization request information to the PCF; and the AMF receives authorization request response information sent by the PCF, and the authorization request response information is used to indicate whether the authorization request of the terminal device is allowed.

In an implementation, the authorization request information further includes at least one of the following:
identification information of the terminal device;
a specific service targeted by the authorization request information;
a specific group targeted by the authorization request information;
a specific service in a specific group targeted by the authorization request information;
a specific external network server or a specific network slice targeted by the authorization request information;
a communication mode targeted by the authorization request information;
PLMN information targeted by the authorization request information;
a communication area targeted by the authorization request information; and
applicable time targeted by the authorization request information.

In an implementation, the network device is an SMF, the authorization information is the first authorization information, and the network device sends the authorization information whose target object is a terminal device includes: the SMF sends the first authorization information to the terminal device.

In an implementation, the method 200 further includes: the SMF receives the first authorization information sent by the PCF.

In an implementation, the first authorization information is carried in a NAS message.

In an implementation, the authorization information includes at least one of the following:
identification information of the terminal device;
whether the terminal device is authorized to serve as a relay terminal device and/or a remote terminal device;
for a specific service, whether the terminal device is authorized to serve as a relay terminal device and/or a remote terminal device;
for a specific group, whether the terminal device is authorized to serve as a relay terminal device and/or a remote terminal device;
for a specific service in a specific group, whether the terminal device is authorized to serve as a relay terminal device and/or a remote terminal device;
for a specific external network server or a specific network slice, whether the terminal device is authorized to serve as a relay terminal device and/or a remote terminal device;
for a communication mode supported or operated by the terminal device, whether the terminal device is authorized to serve as a relay terminal device and/or a remote terminal device;
Public land mobile network (PLMN) information applicable to the authorization information;
a communication area applicable to the authorization information; and
time applicable to the authorization information.

It should be understood that although the method 100 and method 200 are described above respectively, this does not mean that the method 100 and method 200 are independent, and the description of each method may be referred to each other. For example, the related description in the method 100 may be applicable to the method 200. For the sake of brevity, the method 200 is not described too much in this embodiment of the present application.

The preferred embodiments of the present application are described in detail above with reference to the accompanying drawings. However, the present application is not limited to the specific details in the above embodiments. Within the scope of the technical conception of the present application, a variety of simple modifications can be made to the technical solution of the present application, which all belong to the scope of protection of the present application.

For example, in the case of no contradiction, the various specific technical features described in the above specific embodiments can be combined in any suitable way. In order to avoid unnecessary repetition, various possible combinations are not explained separately in the present application.

For another example, various different implementations of the present application can also be combined arbitrarily, as long as they do not violate the idea of the present application, they should also be regarded as the content disclosed in the present application.

It should be understood that in the various method embodiments of the present application, the sequence number of the foregoing processes does not mean the order of execution. The execution order of the processes should be determined by their functions and internal logic, and should not constitute any limitation on the implementation process of the embodiments of the present application.

The communication method according to the embodiment of the present application is described in detail above. The communication apparatus according to the embodiment of the present application will be described below in conjunction with FIG. 8 to FIG. 10. The technical features described in the method embodiments are applicable to the following apparatus embodiments.

FIG. 8 shows a schematic block diagram of a terminal device 300 according to an embodiment of the present application. As shown in FIG. 8, the terminal device 300 includes:

a communication unit 310, configured to receive first authorization information sent by a core network device, and the first authorization information is used to indicate whether to authorize the terminal device to serve as a relay terminal device and/or a remote terminal device.

In an implementation, the first authorization information includes at least one of the following:
  identification information of the terminal device;
  whether the terminal device is authorized to serve as a relay terminal device and/or a remote terminal device;
  for a specific service, whether the terminal device is authorized to serve as a relay terminal device and/or a remote terminal device;
  for a specific group, whether the terminal device is authorized to serve as a relay terminal device and/or a remote terminal device;
  for a specific service in a specific group, whether the terminal device is authorized to serve as a relay terminal device and/or a remote terminal device;
  for a specific external network server or a specific network slice, whether the terminal device is authorized to serve as a relay terminal device and/or a remote terminal device;
  for the communication mode supported or operated by the terminal device, whether the terminal device is authorized to serve as a relay terminal device and/or a remote terminal device;
  public land mobile network (PLMN) information applicable to the first authorization information;
  the communication area applicable to the first authorization information; and
  the time applicable to the first authorization information.

In an implementation, the terminal device 300 further includes: a processing unit, configured to determine whether to apply the first authorization information.

In an implementation, the processing unit is specifically configured to: determine whether to apply the first authorization information according to supported capability information and/or user preference information.

In an implementation, the communication unit 310 is further configured to: send first feedback information to the core network device, and the first feedback information includes the result of whether to apply the first authorization information determined by the terminal device.

In an implementation, the communication unit 310 is further configured to: send authorization request information to the core network device, and the authorization request information is used to request authorization to serve as a relay terminal device and/or a remote terminal device.

In an implementation, the authorization request information further includes at least one of the following:
  identification information of the terminal device;
  a specific service targeted by the authorization request information;
  a specific group targeted by the authorization request information;
  a specific service in a specific group targeted by the authorization request information;
  a specific external network server or a specific network slice targeted by the authorization request information;
  a communication mode targeted by the authorization request information;
  PLMN information targeted by the authorization request information;
  the communication area targeted by the authorization request information; and
  the applicable time targeted by the authorization request information.

In an implementation, the first authorization information is carried in a non-access stratum (NAS) message sent by the core network device.

It should be understood that the terminal device 300 may correspond to the terminal device in the method 100 and can implement corresponding operations of the terminal device in the method 100, which will not be repeated herein for the sake of brevity.

FIG. 9 shows a schematic block diagram of a network device 400 according to an embodiment of the present application. As shown in FIG. 9, the network device 400 includes:

a communication unit 410, configured to send authorization information whose target object is a terminal device, and the authorization information is used to indicate whether to authorize the terminal device to serve as a relay terminal device and/or a remote terminal device.

In an implementation, the network device is an application function (AF) entity, the authorization information is authorization assistance information, and the communication unit 410 is specifically configured to: send the authorization assistance information to the unified data management (UDM).

In an implementation, the communication unit 410 is specifically configured to: send the authorization assistance information to the UDM through the NEF.

In an implementation, the network device is an NEF, the authorization information is authorization assistance information, and the communication unit 410 is specifically configured to send the authorization assistance information to the UDM.

In an implementation, the communication unit 410 is further configured to: receive the authorization assistance information sent by the AF.

In an implementation, the network device is an UDM, the authorization information is authorization assistance information, and the communication unit 410 is specifically configured to: send the authorization assistance information to the policy control function (PCF).

In an implementation, the communication unit 410 is further configured to: receive the authorization assistance information sent by the AF.

In an implementation, the communication unit 410 is specifically configured to: receive the authorization assistance information sent by the AF through the NEF.

In an implementation, the network device 400 further includes: a processing unit, configured to store the authorization assistance information.

In an implementation, the network device is a PCF, the authorization information is the first authorization information, and the communication unit 410 is further configured to: receive authorization assistance information sent by the UDM, the authorization assistance information is used to indicate whether to authorize the terminal device to serve as a relay terminal device and/or a remote terminal device.

The network device 400 further includes a processing unit, configured to determine whether to modify the authorization assistance information according to the operator's policy and/or local configuration information, so as to obtain the first authorization information.

In an implementation, the communication unit 410 is specifically configured to: send the first authorization information to a mobility management function (AMF).

In an implementation, the communication unit 410 is specifically configured to send the first authorization information to the AMF through a transparent container.

In an implementation, the communication unit 410 is further configured to: receive authorization request information sent by the AMF, and the authorization request information is used to request authorization to serve as a relay terminal device and/or a remote terminal device;

The processing unit is further configured to determine whether to allow the authorization request of the terminal device based on the authorization request information;

The communication unit 410 is further configured to send authorization request response information to the AMF, and the authorization request response information is used to indicate whether the authorization request is allowed.

In an implementation, the communication unit 410 is further configured to: receive second feedback information sent by the AMF, and the second feedback information is used to feed back that the AMF does not send the first authorization information to the terminal device.

In an implementation, the communication unit 410 is further configured to: receive the first feedback information sent by the AMF, and the first feedback information includes the result whether to apply the first authorization information determined by the terminal device.

In an implementation, the communication unit 410 is specifically configured to: send the first authorization information to a session management function (SMF).

In an implementation, the network device is an AMF, the authorization information is first authorization information, and the communication unit 410 is further configured to: receive the first authorization information sent by the PCF.

In an implementation, the communication unit 410 is specifically configured to: receive the first authorization information through a transparent container.

In an implementation, the network device 400 further includes: a processing unit, configured to determine whether to send the first authorization information to the terminal device.

In an implementation, the processing unit is specifically configured to determine whether to send the first authorization information to the terminal device according to the capability information that whether the terminal device supports a relay function.

In an implementation, the communication unit 410 is specifically configured to: send the first authorization information to the terminal device.

In an implementation, the communication unit 410 is further configured to: receive first feedback information sent by the terminal device, and the first feedback information includes the result whether to apply the first feedback information determined by the terminal device; and send the first feedback information to the PCF.

In an implementation, the communication unit 410 is further configured to: receive authorization request information sent by the terminal device, and the authorization request information is used to request authorization to serve as a relay terminal device and/or a remote terminal device; send the authorization request information to the PCF; and receive authorization request response information sent by the PCF, and the authorization request response information is used to indicate whether the authorization request of the terminal device is allowed.

In an implementation, the authorization request information further includes at least one of the following:
- identification information of the terminal device;
- a specific service targeted by the authorization request information;
- a specific group targeted by the authorization request information;
- a specific service in a specific group targeted by the authorization request information;
- a specific external network server or a specific network slice targeted by the authorization request information;
- a communication mode targeted by the authorization request information;
- PLMN information targeted by the authorization request information;
- a communication area targeted by the authorization request information; and
- applicable time targeted by the authorization request information.

In an implementation, the network device is an SMF, the authorization information is first authorization information, and the communication unit 410 is specifically configured to: send the first authorization information to the terminal device.

In an implementation, the communication unit 410 is further configured to: receive the first authorization information sent by the PCF.

In an implementation, the first authorization information is carried in a NAS message.

In an implementation, the authorization information includes at least one of the following:
- identification information of the terminal device;
- whether the terminal device is authorized to serve as a relay terminal device and/or a remote terminal device;
- for a specific service, whether the terminal device is authorized to serve as a relay terminal device and/or a remote terminal device;
- for a specific group, whether the terminal device is authorized to serve as a relay terminal device and/or a remote terminal device;
- for a specific service in a specific group, whether the terminal device is authorized to serve as a relay terminal device and/or a remote terminal device;
- for a specific external network server or a specific network slice, whether the terminal device is authorized to serve as a relay terminal device and/or a remote terminal device;
- for a communication mode supported or operated by the terminal device, whether the terminal device is authorized to serve as a relay terminal device and/or a remote terminal device;
- public land mobile network (PLMN) information applicable to the authorization information;
- a communication area applicable to the authorization information; and
- time applicable to the authorization information.

It should be understood that the network device 400 may correspond to the network device in the method 200, and can implement corresponding operations of the network device in the method 200, which will not be repeated herein for the sake of brevity.

FIG. 10 is a schematic structural diagram of a communication device 500 provided by an embodiment of the present application. The communication device 500 shown in FIG. 10 includes a processor 510, and the processor 510 can call and run a computer program from the memory to implement the method according to the embodiment of the present application.

In an implementation, as shown in FIG. 10, the communication device 500 may further include a memory 520. The processor 510 may call and run a computer program from the memory 520 to implement the method according to the embodiment of the present application.

The memory 520 may be a separate device independent from the processor 510, or may be integrated in the processor 510.

In an implementation, as shown in FIG. 10, the communication device 500 may further include a transceiver 530, and the processor 510 may control the transceiver 530 to communicate with other devices. Specifically, it may send information or data to other devices, or receive information or data sent by other devices.

The transceiver 530 may include a transmitter and a receiver. The transceiver 530 may further include one or more antennas.

In an implementation, the communication device 500 may specifically be a network device in this embodiment of the present application, and the communication device 500 can implement the corresponding processes implemented by the network device in the methods according to the embodiments of the present application, which will not be repeated herein for the sake of brevity.

In an implementation, the communication device 500 may specifically be a terminal device of an embodiment of the present application, and the communication device 500 may implement the corresponding processes implemented by the terminal device in the methods according to the embodiments of the present application, which will not be repeated herein for the sake of brevity.

Figure 11:
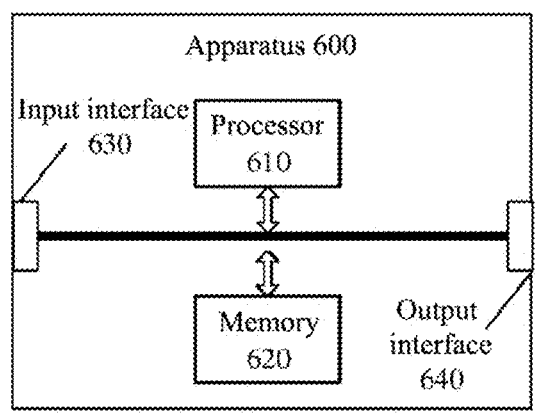
FIG. 11 is a schematic block diagram of an apparatus according to an embodiment of the present application.

FIG. 11 is a schematic structural diagram of an apparatus according to an embodiment of the present application. The apparatus 600 shown in FIG. 11 includes a processor 610, and the processor 610 can call and run a computer program from the memory to implement the method according to the embodiment of the present application.

In an implementation, as shown in FIG. 11, the device 600 may further include a memory 620, and the processor 610 may call and run a computer program from the memory 620 to implement the method according to the embodiment of the present application.

The memory 620 may be a separate device independent from the processor 610, or may be integrated in the processor 610.

In an implementation, the apparatus 600 may further include an input interface 630. The processor 610 can control the input interface 630 to communicate with other devices or chips, and specifically, can obtain information or data sent by the other devices or chips.

In an implementation, the apparatus 600 may further include an output interface 640. The processor 610 can control the output interface 640 to communicate with other devices or chips, and specifically, can output information or data to the other devices or chips.

In an implementation, the apparatus can be applied to the terminal device in the embodiments of the present application, and the apparatus can implement corresponding processes implemented by the terminal device in the methods according to the embodiments of the present application, which will not be repeated herein for the sake of brevity.

In an implementation, the apparatus can be applied to the network device in the embodiments of the present application, and the apparatus can implement the corresponding processes implemented by the network device in the methods according to the embodiments of the present application, which will not be repeated herein for the sake of brevity.

In an implementation, the apparatus 600 may be a chip. It should be understood that the chip referred in the embodiments of the present application may also be referred to as a system-level chip, a system chip, a chip system, or a system on chip.

It should be understood that the processor of the embodiments of the present application may be an integrated circuit chip with the signal processing capability. In the implementation process, the steps of the foregoing method embodiments can be completed by an integrated logic circuit of hardware in the processor or by instructions in a form of software. The above processor can be a General Purpose Processor, a Digital Signal Processor (DSP), an Application Specific Integrated Circuit (ASIC), a Field Programmable Gate Array (FPGA) or other programming logic devices, discrete gates or transistor logic devices, discrete hardware components. The methods, steps, and logical block diagrams disclosed in the embodiments of the present application can be implemented or performed. The general purpose processor may be a microprocessor or the processor may also be any conventional processor or the like. The steps of the method disclosed in the embodiments of the present application can be directly embodied as being performed and completed by a hardware decoding processor, or performed and completed by a combination of hardware and software modules in the decoding processor. The software module can be located in a mature storage medium in the field such as a random access memory, a flash memory, read-only memory, a programmable read-only memory, or an electrically erasable programmable memory, a register. The storage medium is located in the memory, and the processor reads information in the memory and completes the steps of the above method in combination with its hardware.

It can be understood that the memory in the embodiments of the present application may be a volatile memory or a non-volatile memory, or may include both the volatile memory and the non-volatile memory. The non-volatile memory can be a Read-Only Memory (ROM), a Programmable Read-Only Memory (Programmable ROM, PROM), an Erasable Programmable Read-Only Memory (Erasable PROM, EPROM), and an Electrically Erasable Programmable Read-Only Memory (Electrically EPROM, EEPROM) or a flash memory. The volatile memory may be a Random Access Memory (RAM), which is used as an external high-speed cache. By way of exemplary rather than limiting illustration, many forms of RAM are available, such as Static Random Access Memory (Static RAM, SRAM), a Dynamic Random Access Memory (Dynamic RAM, DRAM), a Synchronous Dynamic Random Access Memory (Synchronous DRAM, SDRAM), a Double Data Rate Synchronous Dynamic Random Access Memory (Double Data Rate SDRAM, DDR SDRAM), an Enhanced Synchronous Dynamic Random Access Memory (Enhanced SDRAM, ESDRAM), a Synchlink Dynamic Random Access Memory (Synch link DRAM, SLDRAM) and a Direct Rambus Random Access Memory (Direct Rambus RAM, DR RAM). It should be noted that the memories of the systems and methods described herein are intended to include, but are not limited to, these and any other suitable types of memories.

An embodiment of the present application also provides a computer-readable storage medium for storing a computer program.

In an implementation, the computer-readable storage medium can be applied to the terminal device in the embodiments of the present application, and the computer program enables the computer to perform the corresponding processes implemented by the terminal device in the methods according to the embodiments of the present application, which will not be repeated herein for the sake of brevity.

In an implementation, the computer-readable storage medium can be applied to the network device in the embodiments of the present application, and the computer program enables a computer to perform the corresponding processes implemented by the network device in the methods according to the embodiments of the present application, which will not be repeated herein for the sake of brevity.

An embodiment of the present application also provides a computer program product, including computer program instructions.

In an implementation, the computer program product can be applied to the terminal device in the embodiments of the present application, and the computer program instructions enable the computer to perform the corresponding processes implemented by the terminal device in the methods according to the embodiments of the present application, which will not be repeated herein for the sake of brevity.

In an implementation, the computer program product may be applied to the network device in the embodiments of the present application, and the computer program instructions enable the computer to perform the corresponding processes implemented by the network device in the methods according to the embodiments of the present application, which will not be repeated herein for the sake of brevity.

An embodiment of the present application also provides a computer program.

In an implementation, the computer program can be applied to the terminal device in the embodiments of the present application. When running on the computer, the computer program enables the computer to perform the corresponding processes implemented by the network device in the methods according to the embodiments of the present application, which will not be repeated herein for the sake of brevity.

In an implementation, the computer program can be applied to the network device in the embodiment of the present application. When running on the computer, the computer program enables the computer to perform the corresponding processes implemented by the network device in the methods according to the embodiments of the present application, which will not be repeated herein for the sake of brevity.

Those of ordinary skilled in the art will appreciate that the units and algorithm steps of the examples described in combination with the embodiments disclosed herein can be implemented by electronic hardware or a combination of computer software and electronic hardware. Whether these functions are performed by hardware or software depends on the specific application and design constraints of the technical solution. The professional technicians can use different methods for each specific application to implement the described functions, but such implementation should not be considered to be beyond the scope of the present application.

Those skilled in the art can clearly understand that, for brevity and concise of description, the specific working process of the above described system, apparatus, and unit can refer to the corresponding processes in the foregoing method embodiments, and will not be repeated herein.

In the several embodiments provided by the present application, it should be understood that the disclosed system, apparatus, and method may be implemented in other ways. For example, the apparatus embodiments described above are merely illustrative. For example, division of the unit is only a logical function division, and there may be other divisions in actual implementation. For example, multiple units or components may be combined or be integrated into another system, or some features can be ignored or not implemented. In addition, mutual coupling or direct coupling or communication connection shown or discussed may be an indirect coupling or communication connection through some interfaces, apparatuses or units, and may be in electrical, mechanical or other forms.

The units described as separate components may be or may not be physically separate. The components displayed as units may be or may not be physical units, that is, they may be located in one place, or may be distributed to multiple network units. Some or all of the units may be selected according to actual needs to achieve the purpose of the solution of the embodiment.

In addition, the functional units in the various embodiments of the present application may be integrated into one processing unit, or each unit may exist alone physically, or two or more units may be integrated into one unit.

If the functions are implemented in the form of a software functional unit and sold or used as independent products, they can be stored in a computer readable storage medium. Based on such understanding, the technical solution of the present application, or the part contributing to the prior art or the part of the technical solution can be embodied in the form of a software product in essence. The computer software product is stored in a storage medium and includes instructions for enabling a computer device (which may be a personal computer, a server, or a network device, etc.) to perform all or part of the steps of the methods according to the embodiments of the present application. The aforementioned storage media includes various media that can store program code, such as a USB flash disk, a mobile hard disk, a Read-Only Memory (ROM), a Random Access Memory (RAM), a magnetic disk or an optical disk.

The above is only a specific implementation of the present application, the scope of protection of the present application is not limited thereto, and changes or substitutions that can be easily thought of by those skilled in the art within the technical scope disclosed in the present application should be covered by the scope of protection of the present application. Therefore, the scope of protection of the present application should be subject to the scope of protection of the claims.

What is claimed is:

1. A communication method, comprising:
    receiving, by a terminal device, first authorization information sent by a policy control function (PCF), wherein the first authorization information is used to indicate whether to authorize the terminal device to serve as at least one of a relay terminal device and a remote terminal device communicating through a relay terminal, wherein the first authorization information is determined by the PCF according to authorization assistance information received from a unified data management (UDM);
    wherein the first authorization information comprises: for a specific network slice, whether the terminal device is authorized to serve as at least one of a relay terminal device and a remote terminal device communicating through a relay terminal;
    wherein the first authorization information is valid within a duration of a timer and is invalid when the timer expires, wherein the timer is configured by the PCF for the terminal device.

2. The method according to claim 1, wherein the first authorization information further comprises at least one of the following:
    identification information of the terminal device;
    whether the terminal device is authorized to serve as at least one of a relay terminal device and a remote terminal device communicating through a relay terminal;
    for a specific service, whether the terminal device is authorized to serve as at least one of a relay terminal device and a remote terminal device communicating through a relay terminal;
    for a specific group, whether the terminal device is authorized to serve as at least one of a relay terminal device and a remote terminal device communicating through a relay terminal;
    for a specific service in a specific group, whether the terminal device is authorized to serve as at least one of a relay terminal device and a remote terminal device communicating through a relay terminal;
    for a specific external network server, whether the terminal device is authorized to serve as at least one of a relay terminal device and a remote terminal device communicating through a relay terminal; and
    public land mobile network (PLMN) information applicable to the first authorization information.

3. The method according to claim 1, wherein the method further comprises:
    determining, by the terminal device, whether to apply the first authorization information according to at least one of supported capability information and user preference information.

4. The method according to claim 3, wherein the method further comprises:
    sending, by the terminal device, first feedback information to the PCF, wherein the first feedback information comprises a result of whether to apply the first authorization information determined by the terminal device.

5. The method according to claim 1, wherein the first authorization information is carried in a non-access stratum (NAS) message sent by the PCF.

6. A non-transitory computer-readable storage medium, wherein the non-transitory computer-readable storage medium is configured to store a computer program that causes a computer to perform the method according to claim 1.

7. A communication method, comprising:
    sending, by a policy control function (PCF), authorization information to an access and mobility management function (AMF) or session management function (SMF), wherein a target object of the authorization information is a terminal device, wherein the authorization information is used to indicate whether to authorize the terminal device to serve as at least one of a relay terminal device and a remote terminal device communicating through a relay terminal, wherein the authorization information is determined by the PCF according to authorization assistance information received from a unified data management (UDM);
    configuring, by the PCF, a timer for the terminal device, wherein authorization information is valid within a duration of the timer and is invalid when the timer expires;
    wherein the authorization information comprises: for a specific network slice, whether the terminal device is authorized to serve as at least one of a relay terminal device and a remote terminal device communicating through a relay terminal.

8. The method according to claim 7, wherein the authorization information further comprises at least one of the following:
    identification information of the terminal device;
    whether the terminal device is authorized to serve as at least one of a relay terminal device and a remote terminal device communicating through a relay terminal;
    for a specific service, whether the terminal device is authorized to serve as at least one of a relay terminal device and a remote terminal device communicating through a relay terminal;
    for a specific group, whether the terminal device is authorized to serve as at least one of a relay terminal device and a remote terminal device communicating through a relay terminal;
    for a specific service in a specific group, whether the terminal device is authorized to serve as at least one of a relay terminal device and a remote terminal device communicating through a relay terminal;
    for a specific external network server, whether the terminal device is authorized to serve as at least one of a relay terminal device and a remote terminal device communicating through a relay terminal; and
    public land mobile network (PLMN) information applicable to the authorization information.

9. A non-transitory computer-readable storage medium, wherein the non-transitory computer-readable storage medium is configured to store a computer program that causes a computer to perform the method according to claim 6.

10. A terminal device, comprising: a processor and a transceiver connected with the processor, wherein the processor is configured to call and run a computer program from a memory to enable the processor to:
   receive, through the transceiver, first authorization information sent by a policy control function (PCF), wherein the first authorization information is used to indicate whether to authorize the terminal device to serve as at least one of a relay terminal device and a remote terminal device communicating through a relay terminal, wherein the first authorization information is determined by the PCF according to authorization assistance information received from a unified data management (UDM);
   wherein the first authorization information comprises: for a specific network slice, whether the terminal device is authorized to serve as at least one of a relay terminal device and a remote terminal device communicating through a relay terminal;
   wherein the first authorization information is valid within a duration of a timer and is invalid when the timer expires, wherein the timer is configured by the PCF for the terminal device.

11. The terminal device according to claim 10, wherein the first authorization information further comprises at least one of the following:
   identification information of the terminal device;
   whether the terminal device is authorized to serve as at least one of a relay terminal device and a remote terminal device communicating through a relay terminal;
   for a specific service, whether the terminal device is authorized to serve as at least one of a relay terminal device and a remote terminal device communicating through a relay terminal;
   for a specific group, whether the terminal device is authorized to serve as at least one of a relay terminal device and a remote terminal device communicating through a relay terminal;
   for a specific service in a specific group, whether the terminal device is authorized to serve as at least one of a relay terminal device and a remote terminal device communicating through a relay terminal;
   for a specific external network server, whether the terminal device is authorized to serve as at least one of a relay terminal device and a remote terminal device communicating through a relay terminal; and
   public land mobile network (PLMN) information applicable to the first authorization information.

12. The terminal device according to claim 10, wherein the computer program further enables the processor to:
   determine, according to at least one of supported capability information and user preference information, whether to apply the first authorization information.

13. The terminal device according to claim 12, wherein the computer program further enables the processor to:
   send, through the transceiver, first feedback information to the PCF, wherein the first feedback information comprises a result of whether to apply the first authorization information determined by the terminal device.

14. The terminal device according to claim 10, wherein the first authorization information is carried in a non-access stratum (NAS) message sent by the PCF.

15. A network device, comprising: a processor and a transceiver connected with the processor, wherein the processor is configured to call and run a computer program from a memory to enable the processor to:
   send, through the transceiver, authorization information to an access and mobility management function (AMF) or session management function (SMF), wherein a target object of the authorization information is a terminal device, wherein the authorization information is used to indicate whether to authorize the terminal device to serve as at least one of a relay terminal device and a remote terminal device communicating through a relay terminal, wherein the authorization information is determined by the PCF according to authorization assistance information received from a unified data management (UDM);
   configuring, by the PCF, a timer for the terminal device, wherein authorization information is valid within a duration of the timer and is invalid when the timer expires;
   wherein the authorization information comprises: for a specific network slice, whether the terminal device is authorized to serve as at least one of a relay terminal device and a remote terminal device communicating through a relay terminal.

16. The network device according to claim 15, wherein the authorization information further comprises at least one of the following:
   identification information of the terminal device;
   whether the terminal device is authorized to serve as at least one of a relay terminal device and a remote terminal device communicating through a relay terminal;
   for a specific service, whether the terminal device is authorized to serve as at least one of a relay terminal device and a remote terminal device communicating through a relay terminal;
   for a specific group, whether the terminal device is authorized to serve as at least one of a relay terminal device and a remote terminal device communicating through a relay terminal;
   for a specific service in a specific group, whether the terminal device is authorized to serve as at least one of a relay terminal device and a remote terminal device communicating through a relay terminal;
   for a specific external network server, whether the terminal device is authorized to serve as at least one of a relay terminal device and a remote terminal device communicating through a relay terminal; and
   public land mobile network (PLMN) information applicable to the authorization information.

* * * * *